United States Patent [19]
Suzuki et al.

[11] Patent Number: 5,148,517
[45] Date of Patent: Sep. 15, 1992

[54] PRINT DATA GENERATOR

[75] Inventors: Masahiro Suzuki; Masato Nagata, both of Tokyo, Japan

[73] Assignee: Oki Electric Industry Co., Ltd., Tokyo, Japan

[21] Appl. No.: 454,038

[22] Filed: Dec. 20, 1989

[30] Foreign Application Priority Data

Dec. 26, 1988 [JP] Japan .................. 63-326265

[51] Int. Cl.$^5$ ........................................ G06K 15/00
[52] U.S. Cl. .................................. 395/115; 395/110
[58] Field of Search ............... 395/101, 110, 115, 147, 395/150, 164–165; 340/723, 735, 739, 747, 748, 796, 794, 803; 400/61, 50–52, 65, 69

[56] References Cited

U.S. PATENT DOCUMENTS

| 4,653,020 | 3/1987 | Cheselka et al. | 395/115 |
| 4,675,833 | 6/1987 | Cheek et al. | 395/115 |
| 4,779,223 | 10/1988 | Asai et al. | 395/115 |
| 5,047,957 | 12/1991 | Ikenoue | 364/115 |

Primary Examiner—Arthur G. Evans
Attorney, Agent, or Firm—Spencer, Frank & Schneider

[57] ABSTRACT

A print data generator for modifying bit-mapped image data according to bit-mapped font data includes an image memory for storing image words consisting of L bits each, a font memory for storing font words consisting of L bits each, the number of words in each line of the font being (N−1). A number selecting controller selects a number S representing a bit offset between the image words and the font words, and a width number W which is one greater than the number of font words (N−1) per line. A shift clock generator receives the offset number S and repeatedly generates a series of shift clock pulses of S pulses each. A font shifter receives (N−1) successive font words from the font memory and receives the series of S shift clock pulses and generates shifted font words, the first shifted font word in each line having (L-S) bits at the head of the first font word for the (L-S) bits at the tail of the shifted font word. The last shifted font word in each line has S bits at the tail of the last font word for the S bits at the head of the shifted font word. The shifted font words, other than the first and last shifted font words, each consists of (L-S) bits at the head of one received font word for the tail of the shifted font word.

8 Claims, 8 Drawing Sheets

PRINT DATA GENERATOR

BACKGROUND OF THE INVENTION

This invention relates to a print data generator for generating bit-mapped image data in a device such as a page printer.

Such a device generally has an image memory for storing bit-mapped image data, and a modifying data memory, typically a font memory, formed for example of a RAM or a ROM, for storing the bit maps of characters and symbols. To print a character or symbol, its bit map is read from the font memory a word at a time, similar words of image data are read from the image memory, and an operation is performed on the font words and corresponding image words to modify the image words. The modified image words are then written back to the same memory location in the image memory from which the particular image words have been read. The modified image words are then supplied to a print engine, not shown, for printing. The image data may already contain font data developed therein, or data representing graphics, rule marks, background pictures, etc. The operation for the modification of the image data may be a logical sum (OR) operation, a logical product (AND) operation, or an exclusive logical sum (ex-OR) operation on the data input at the X input terminal and the Y input terminal, or selection of one of the data at the X input terminal or the data at the Y input terminal. When a "transparent printing," in which neither of the black dots in the image data and the black dots in the font data are suppressed, is to be performed, the logical sum operation is performed. When a "non-transparent printing," in which the image data is suppressed in the area where the font data is superimposed, and the bits of the font data become the bits of the image data, is to be performed, the selection of the bits of the font data is performed.

The process is complicated by the fact that the font words may be offset from the image words by a certain number of bits. Before the operation is performed, the font words must then be shifted to align them with the image words. A by-product of this shift is that in each line of image data, the initial bits of the first image word and the final bits of the last image word are not covered by font data. The operation must therefore be disabled on the uncovered bits to avoid modifying image data outside the width of the character or symbol. Control words comprising enable bits and disable bits are used for this purpose.

The data generation process is overseen by a controller such as a microprocessor which specifies the addresses of the image data and font data in their respective memories, and the bit offset between the font words and image words. The microprocessor may also shift the font data, perform the necessary modification of image words, and write the modified image words back to image memory. These tasks are time-consuming, however, and the controller has other tasks to perform as well, such as generating bit maps from mathematical descriptions and communicating with a host computer.

Specialized hardware has therefore been developed for generating print data. Such specialized hardware typically comprises a shift register for shifting the font words and a programmable arithmetic-logic unit for carrying out a specified operation on the font words and image words. By performing these tasks independently, such specialized hardware can significantly speed up the generation of print data while leaving the controller free to perform other tasks.

However, it has still been necessary for the controller to control the specialized hardware fairly closely. A particular problem is that the controller has to identify the first, intermediate, and last image words in each line and set corresponding mask control data in a register in the specialized hardware. Control of the specialized hardware thus still imposes a significant load on the controller and slows down the printing process, particularly on pages with large numbers of characters or symbols.

SUMMARY OF THE INVENTION

An object of the present invention is accordingly to generate print data without imposing a heavy load on the controller.

A particular object of this invention is to generate mask control data automatically.

A print data generator according to the invention is for modifying bit-mapped image data according to bit-mapped font data. It comprises:

an image memory (14) for storing image words, each word consisting of L bits;

a font memory (13) for storing font words each word consisting of L bits with the number of words in each line of a font being $(N-1)$;

a number selecting controller (11) for selecting a bit offset number S representing a bit offset between said image words and said font words, and a width number W which is one greater than the number of font words $(N-1)$ per line;

a shift clock generator (5) for receiving said offset number S from said number selecting controller and repeatedly generating series of shift clock pulses comprising S pulses each;

a font shifter (6) for receiving $(N-1)$ successive font words from said font memory and receiving said series of S shift clock pulses from said shift clock generator, and generating shifted font words, the last shifted font word in each line consisting of S bits at the tail of the last font word for the S bits at the head of the shifted font word;

the first shifted font word in each line consisting of $(L-S)$ bits at the head of the first font word for the $(L-S)$ bits at the tail of the shifted font word;

the shifted font words other than the first and last shifted font words each consisting of $(L-S)$ bits at the head of one received font word for the tail of the shifted font word and S bits at the tail of the preceding received font word for the head of the shifted font word;

a mask control data source (7) for receiving said series of S shift clock pulses from said shift clock generator and generating source mask control words comprising S disable bits followed exclusively by enable bits;

a mask control data converter (8) for receiving data indicative of the width number N from said number selecting controller, receiving said source mask control words from said mask control data source, and generating converted mask control words by passing the first source mask control word through unaltered, substituting all enable bits for the next $(N-2)$ source mask control words, and inverting the Nth source mask control word; and an arithmetic-logic unit (19) for receiving an image word from said image memory, a shifted font word from said font shifter, and a converted mask control word from said mask control data converter, and using said font word to modify bits of said image word that correspond to enable bits in said converted mask control word, thereby creating a modified image word; and means (20, 12) for transferring said modified image word to said image memory.

DETAILED DESCRIPTION OF THE INVENTION

A novel print data generator for modifying bit-mapped image data according to bit-mapped font data will be described with reference to the drawings. The image data and modifying data, such as font data, both comprise words consisting of a certain number, L, of bits, such as eight, sixteen, or thirty-two bits. In the drawings, words will be shown as consisting of eight bits. In the following description, the modifying data are assumed to be font data, but the invention is applicable where the modifying data are other than font data.

Overall Operation

Figure 1:
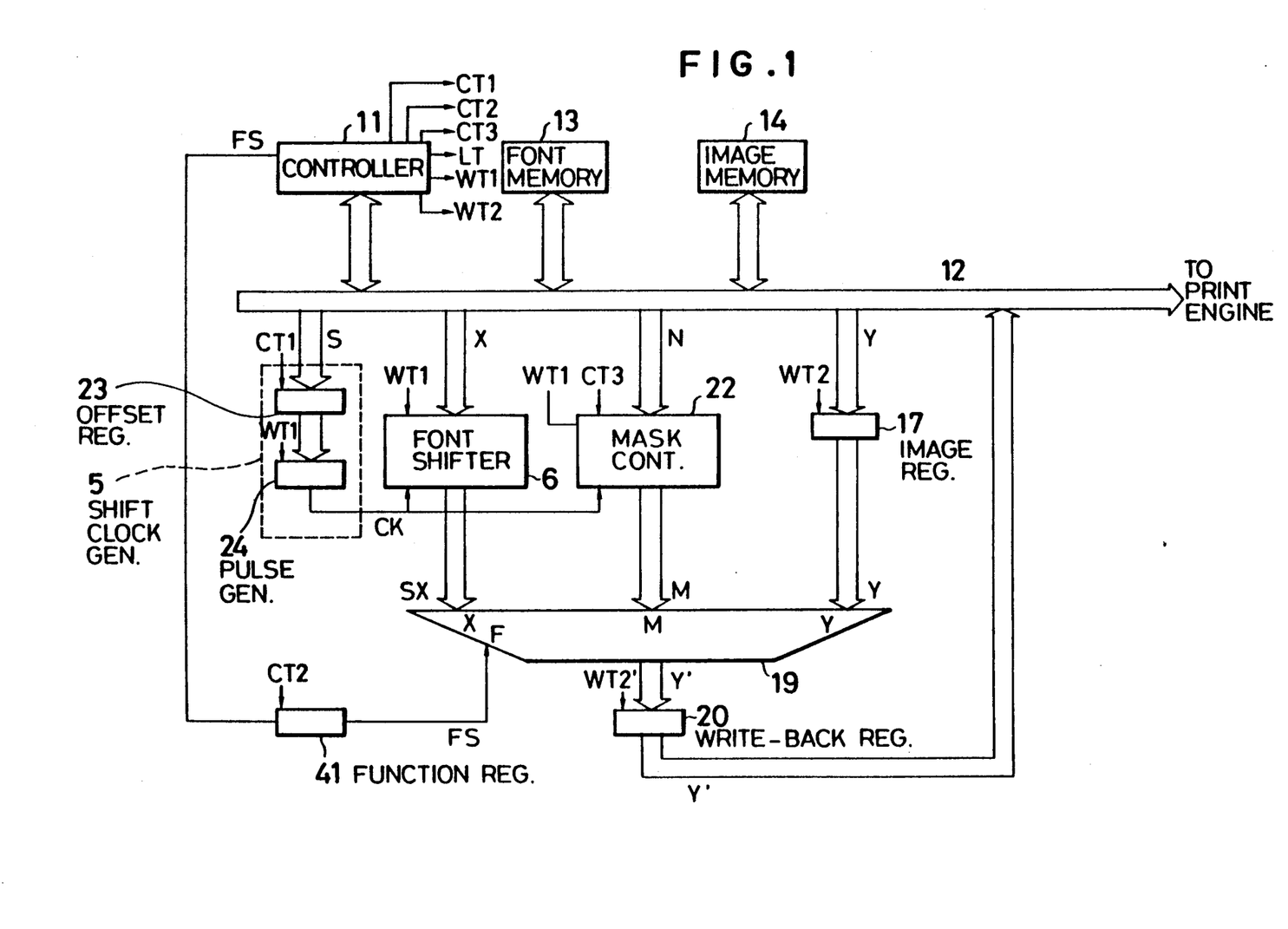
FIG. 1 is a block diagram of a print-data generator.
Figure 2:
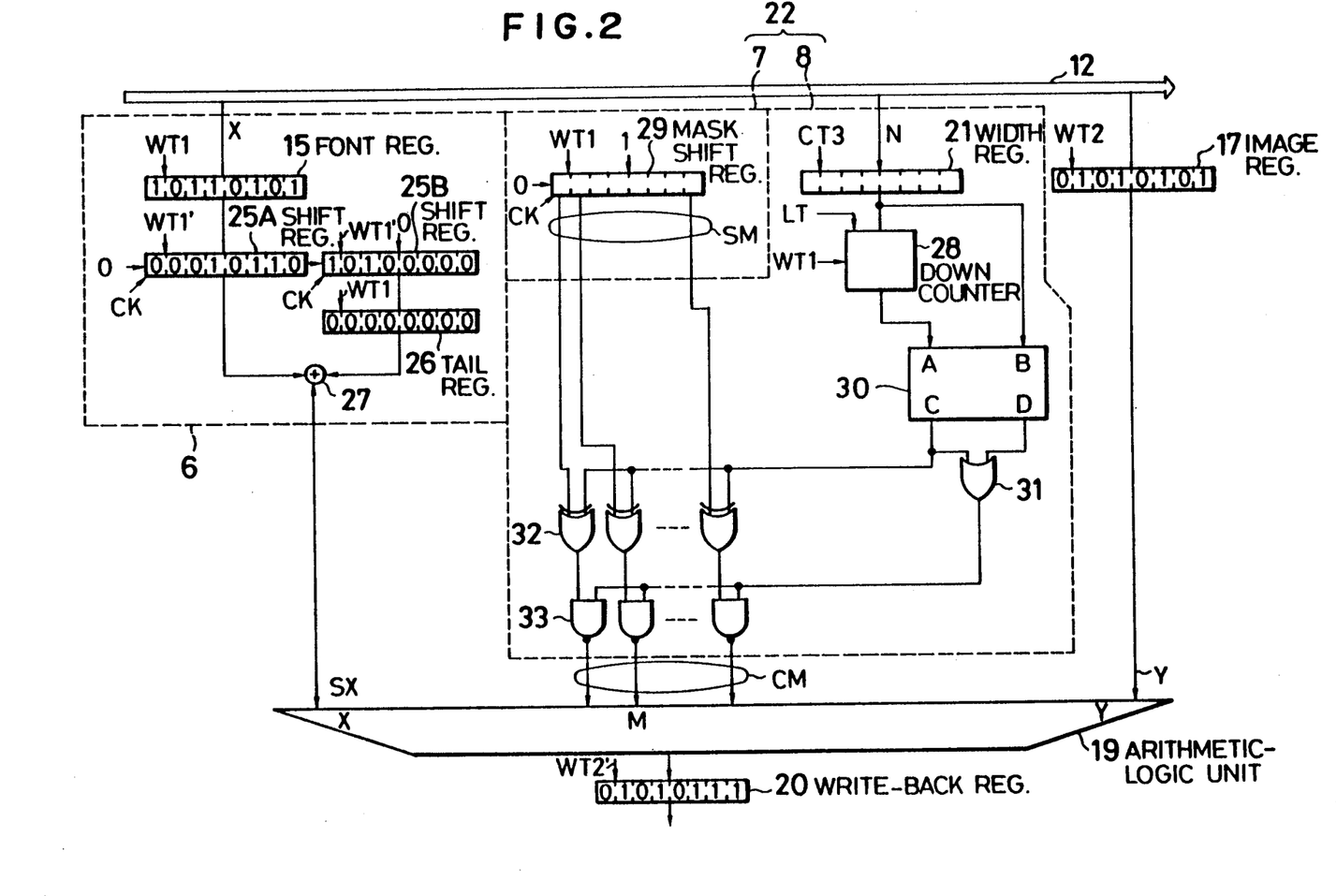
FIG. 2 is a more detailed block diagram of the font shifter and the mask controller in FIG. 1.

Referring now to FIG. 1 and FIG. 2, words of image data are stored in an image memory 14, and words of font data are stored in a font memory 13. The font data is read from the font memory 13 and the image data is read from the image memory 14, an operation is performed on the image data and the font data by use of an arithmetic operation unit 19, and the result of the operation, i.e., the modified image data is written into the image memory 14. The modified image data is supplied to a print engine for printing.

More specifically, the image memory 14 and the font memory 13 are connected to a bus 12 for the exchange of data a word at a time with other parts of the print data generator. The image data read from the image memory 14 is stored in an image register 17, while the font data read from the font memory 13 is supplied to a font shifter 6, where it is shifted by a predetermined number of bit positions for alignment with the image data. The operation on the image data Y and the font data X for modifying the image data Y is performed by an arithmetic-logic unit (ALU) 19, and the result of the operation, the modified image data Y′, is stored in a write-back register 20. It should be noted that the modified image data Y′ obtained at the output of the arithmetic-logic unit 19 is written in the same memory location within the image memory 14 from which the image data Y has been read. The overall control is by the controller 11.

The components of the circuit shown in FIG. 1 are described in turn.

Image Memory 14

The image memory 14 comprises random-access memory elements (RAM) that can be both written and read. The image memory 14 stores image data of one or more pages of print output. The image data stored in the image memory 14 is supplied to a print engine, not shown, for printing.

Figure 3A:
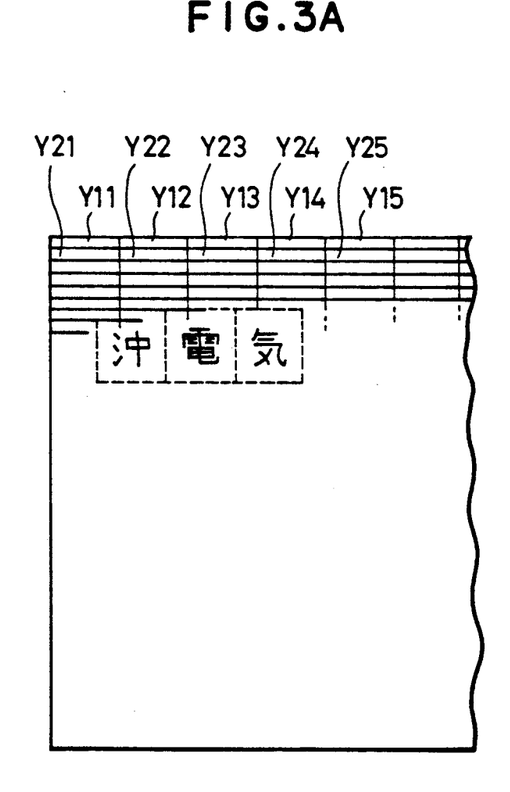
FIG. 3A shows an example of print-out of part of one page.
Figure 3B:
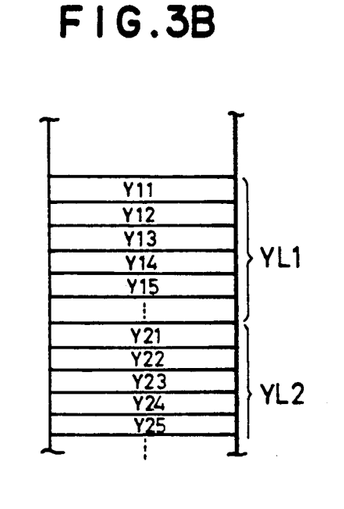
FIG. 3B shows how the image words are arranged in the image memory.

FIG. 3A shows an example of print-out of part of one page, in which Japanese characters "oki," "den," and "ki" are printed. The data stored in the image memory 14 is again in the form of words stored at respective memory locations (addresses). The order of the words stored in the image memory 14 is such that all the words in each line of the page are stored in consecutive order from the left of the line to the right of the line, and then the words of the next line are stored in the succeeding memory locations in the same order (from the left to the right of the line). The words of the following lines are stored in the same manner. This is illustrated in FIG. 3B, in which Y11, Y12, ... Y15 are the image words for the print out of the first line in FIG. 3A, and correspond to the blocks Y11, Y12, ... Y15 in FIG. 3A; Y21, Y22, ... Y25 are the image words for the print out of the second line in FIG. 3A, and correspond to the blocks Y21, Y22, ... Y25 in FIG. 3A. "YL1," "YL2," ... to the right of FIG. 3B denote the lines of in the page in FIG. 3A.

Font Memory 13

Figure 4A:
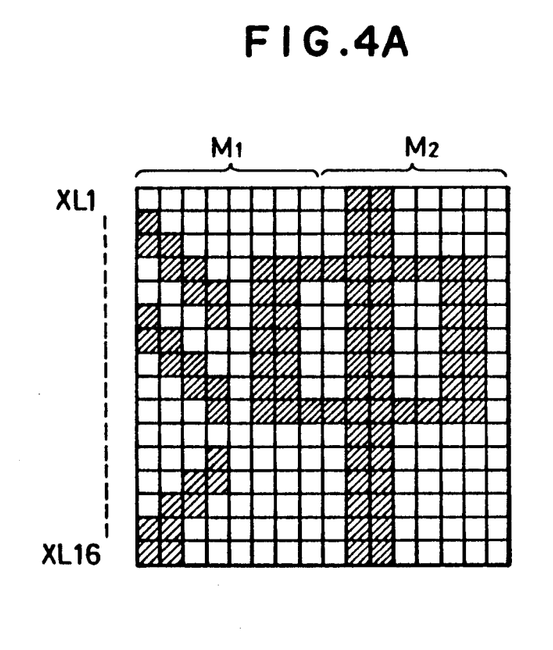
FIG. 4A shows an example of font data in a dot matrix representation.
Figure 4B:
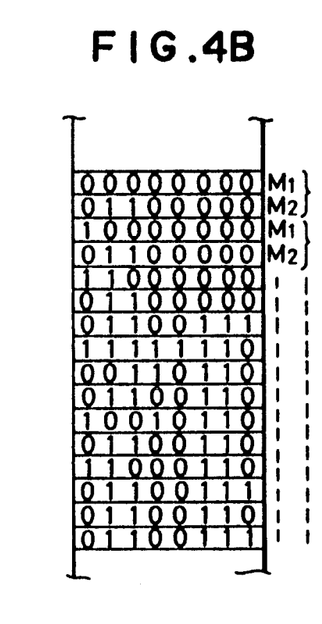
FIG. 4B shows how the font words are arranged in the font memory.

The font memory 13 comprises RAM elements or read-only memory elements (ROM). The font may represent bit-mapped data of a 16×16 dot matrix as shown in FIG. 4A. The character shown in FIG. 4A is a Japanese character that is read "oki." The bit-mapped data is actually stored word by word, each in each memory location (address) in the font memory as shown in the FIG. 4B. In FIG. 4B, data "0" corresponds to a white dot in FIG. 4A and data "1" corresponds to a black (hatched) dot in FIG. 4A. "XL1," "XL2," ... to the right of FIG. 4B denote the lines of in the dot matrix shown in FIG. 4A. As each line consists of 16 dots, whereas each word consists of 8 bits, each line is made up of two words. The marks "$M_1$," and "$M_2$" to the right of FIG. 4B indicate whether each word is the first word or the second word in each line.

Controller 11

Figure 8:
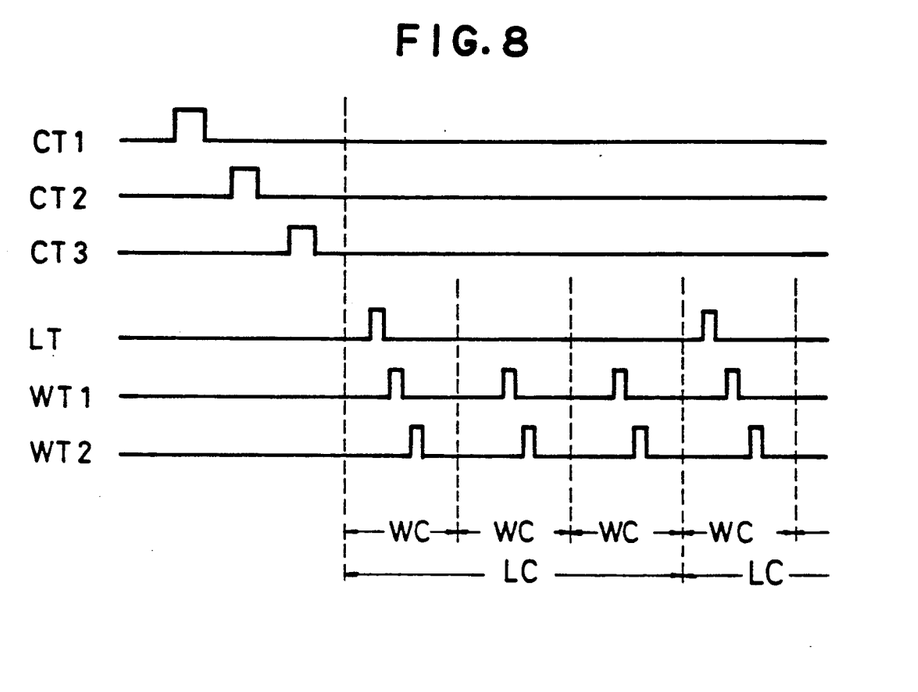
FIG. 8 is a time chart showing signals produced by the controller.

The controller 11 comprises a standard microprocessor or similar device. Two of the functions of the controller 11 unique to this invention are to select an offset number S, and a width number N. The offset number S represents a bit offset between font data and image data. The width number N is one greater than the number of font words per line of font data. Other functions of the controller 11 include generating character timing signals CT1, CT2 and CT3, a line timing signal L and word timing signals WT1 and WT2. As shown in FIG. 8, the character timing signals CT1, CT2 and CT3 are generated at the beginning of processing of each character or font, the line timing signal is generated at the beginning of processing (line cycle LC) of each line within each font, and the word line timing signals WT1 and WT2 are generated at the beginning of processing (word cycle WC) of each word in each line. Additional word timing signals WT1' and WT2' are generated by delay means formed of dedicated hardware elements, not shown, which delays the word timing signals WT1 and WT2, respectively, by a predetermined delay time to produce the additional word timing signals WT1' and WT2'.

Shift Clock Generator 5

A shift clock generator 5 is connected to the bus 12 for receiving the shift number S from the controller 11 and storing the shift number S when the character timing signal CT1 is produced, and repeatedly generating series of shift clock pulses comprising S pulses each.

The shift clock generator 5 has an offset register 23 and a programmable pulse generator 24. The offset register 23 receives the offset number S from the controller 11 via the bus 12 and stores it. Thereafter, each time a word timing signal WT1 is given via a signal line, also denoted by WT1, the offset register 23 transfers the offset number S to the programmable pulse generator 24 and the programmable pulse generator 24 generates a series of S shift clock pulses in synchronism with a clock of the controller 11.

Font Shifter 6

A font shifter 6 is connected to the bus 12 for receiving the font words from the font memory 13 and storing the font word when the word timing signal WT1 is produced, and also receiving the shift clock pulses from the shift clock generator 5, and generating shifted font words SX. The composition of each of the shifted font words SX differs depending on whether it is the first shifted word in each line, the last shifted word in each line, or other than the first and the last.

(a) The last shifted font word in each line consists of S bits at the tail of the last font word for the S bits at the head of the shifted font word, and zero bits for the remaining bits.

(b) The first shifted font word in each line consists of (L-S) bits at the head of the first font word for the (L-S) bits (L being the number of bits per word) at the tail of the shifted font word, and zero bits for the remaining bits.

(c) The shifted font words other than the first and last shifted font words each consists of (L-S) bits at the head of one received font word for the tail of the shifted font word and S bits at the tail of the preceding received font word for the head of the shifted font word.

The font shifter 6 comprises a font register 15 for receiving a font word X from the bus 12. In FIG. 2, it is shown to be storing a word "10110101."

The font word stored in the font register 15 is promptly transferred to a first shift register 25A.

A shift register is a device for storing a word of data and shifting it in a certain direction (to the right in the drawings). The word can be input to and output from the shift register in parallel, all bits at once, but the shift register also has a serial input terminal at one end (the left end in the drawings) and a serial output terminal at the other end (the right end in the drawings) for input and output of one bit at a time. The shift register furthermore has a clock terminal for receiving shift clock pulses. Each time a shift clock pulse is received, each bit of the stored word is shifted one position to, for example, the right, causing the rightmost bit to be shifted out through the serial output terminal and the leftmost bit position to be filled with a bit input through the serial input terminal.

The first shift register 25A receives a series of S shift clock pulses from the shift clock generator 5 and thereby shifts the stored font word to the right by S bit positions. Zero bits are stored in the vacated bit positions, by grounding the serial input terminal of the first shift register 25A, for example. The bits shifted out of the first shift register 25A are supplied to the serial input terminal of a second shift register 25B.

By means of the word timing signal WT1, the second shift register 25B is reset to all-zero data each time the first shift register 25A receives a font word. The second shift register 25B also receives the series of S=3 shift clock pulses from the shift clock generator 5, which cause it to shift the all-zero data to the right by S bit positions. The vacated bit positions are filled with bits shifted out of the first shift register 25A. FIG. 2 shows a state in which the data transferred from the register 15 has been shifted by three bits. The shift register 25B has been reset to all-zero before the shift.

A tail register 26 is connected to receive the parallel output of the second shift register 25B. When the modified image word is transferred from the write-back register 20 to the image memory 14, the contents of the second shift register 25B are transferred in parallel to the tail register 26. This transfer takes place responsive to the word timing signal WT1.

The contents of the first shift register 25A and the tail register 26 are supplied to an OR-logic circuit 27, which performs an OR operation on them and sends the result, as the output of the font shifter 6, to the X input terminal of the arithmetic-logic unit 19. The OR-logic circuit 27 may comprise, for example, wired-OR connections of corresponding parallel bit output lines from the first shift register 25A and the tail register 26.

Image register 17

The image register 17 temporarily stores the image word Y read from the image memory 14 responsive to the timing signal WT2, and sends it to the Y input terminal of the arithmetic-logic unit 19. In FIG. 2, the data shown to be stored consists of a word "01010101."

Arithmetic-logic Unit 19

The arithmetic-logic unit 19 performs various operations. For instance, it performs a logical sum (OR) operation, a logical product (AND) operation, or an exclusive logical sum (ex-OR) operation on the data input at the X input terminal and the Y input terminal, or it selects one of the data at the X input terminal or the data at the Y input terminal, and outputs the selected data. When the "transparent printing," in which neither of the black dots in the image data and the black dots in the font data are suppressed, is to be performed, the logical sum operation is performed. When the "non-transparent printing," in which the image data is suppressed in the area where the font data is superimposed, and the bits of the font data become the bits of the image data, is to be performed, the data at the X input terminal is selected and output.

The arithmetic-logic unit 19 has a function specifying input terminal F through which function specifying data FS is input from a function register 41. The function specifying data FS is set in the register 41 by the controller 11 when the character timing signal CT2 is produced. The function specifying data FS specifies an operation to be performed by the arithmetic-logic unit 19.

The arithmetic-logic unit 19 also has an input terminal M for receiving converted mask control word CM from a mask controller 22, to be described later. The mask control data designates whether the operation at the arithmetic-logic unit 19 should be performed on the respective bits. The net effect is that the arithmetic-logic unit 19 performs the operation specified by the function specifying data FS on those bits of the image word Y that correspond to enable bits in the converted mask control word CM.

Write-back Register 20

The write-back register 20 temporarily stores the output of the arithmetic-logic unit 19, that is a modified image word Y', when the word timing signal WT2' is produced. In FIG. 2, the modified image word Y' stored in the writeback register 20 is a word "0101011." This assumes that a logical sum operation has been performed by the arithmetic-logic unit 19 on the data input at the X and Y input terminals. The modified image word Y' is then transferred to the image memory 14 via the bus 12.

Mask Controller 22

The mask controller 22 which is provided to generate mask control words for enabling or disabling the operation on each bit in each image word. The mask controller 22 comprises a mask control data source 7 and a mask control data converter 8.

Mask Control Data Source 7

The mask control data source 7 receives the above mentioned series of S shift clock pulses from the shift clock generator 5 and generates source mask control words comprising S disable bits followed exclusively by enable bits.

The mask control data source 7 comprises a mask shift register 29, in which a word of all "1" is set each time the word timing signal WT1 is input, and a bit "0" is serially input each time a shift clock CK is input, and the data stored is shifted by one bit position, toward the right, as seen in FIG. 2. When S=3 shift clock pulses have been received, the mask shift register 29 provides a source mask control word comprising S disable bits followed exclusively by enable bits. In the succeeding discussion, a disable bit will be a "0" bit and an enable bit will be a "1" bit. Thus, the mask shift register 29 serves to generate source mask control words that are used for selectively enabling and disabling the operation at the arithmetic-logic unit 19.

Mask Control Data Converter 8

The mask control data converter 8 receives data indicative of the width number N from the controller 11 and stores the width number N when the character timing signal CT3 is produced, and the mask control words from the mask control data source 7, and generates converted mask control words by passing the first mask control word through unaltered, substituting all enable bits for the next N−2 mask control words, and inverting the Nth mask control word.

Width Register 21

Figure 5:
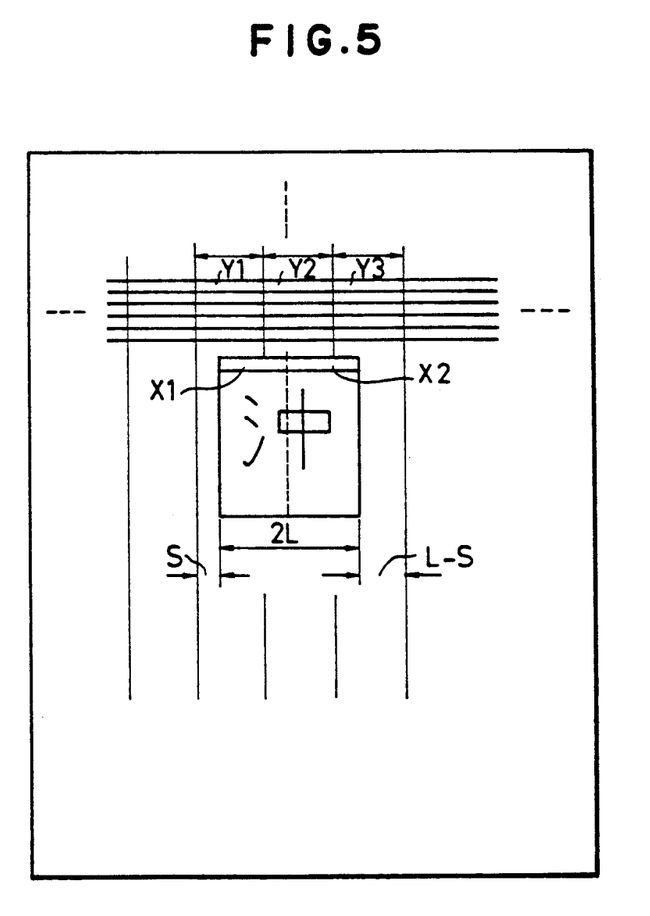
FIG. 5 shows how a font data is superimposed on an image data.

The mask control word converter 8 comprises a width register 21 which receive the width number N from the controller 11, and stores the width number N when the character timing signal CT3 is produced. This number is one greater than the number of font words in a font, and signifies the number of the image words in each line partly or entirely superimposed with a font. For instance, where the character or font is as shown in FIG. 4A, the number of the words in each line is 2, and the number N stored in the width register 21 is 3. This means for performing the image data modifying operation, three words, rather than two words, must be read from the image memory 14, since the font word may be offset with respect to the image word, as shown in FIG. 5. In FIG. 5, the font words are offset by three bit positions and the font or the character area L is superimposed partially or entirely with three image words in each line.

Down Counter 28

The mask control word converter 8 also comprises a down counter 28. Responsive to the line timing signal LT produced at the beginning of processing of each line, the number N is transferred from the width register 21 to the down counter 28. Each time a word timing signal WT1 is input, the down counter 28 is decremented by one. When the word timing signal WT1 is input three times, the count value of the down counter 28 is reduced to "0." At the beginning of processing of the next line in the font data, the line timing signal LT is again supplied, and responsive to this line timing signal LT, the number N is again transferred from the width register 21 to the down counter 28.

Comparator 30

The mask controller 22 further comprises a comparator 30 for receiving at an A input terminal the output of the down counter 28, and at a B input terminal, the output of the width register 21, comparing data at the A input terminal and data at the B input terminal, and if A=B−1, produces "1" at the C output terminal, and "0" at the D terminal, and if A=0, produces "0" at the C output terminal, and "1" at the D terminal, and if neither A=B−1, nor A=0 is satisfied, produces "0" both at the C output terminal and the D terminal.

Or Gate 31, Exclusive-OR Gates 32, and NAND Gates 33

The mask controller 22 further comprises an OR gate 31, exclusive-OR gates 32, and NAND gates 33 connected as illustrated. Although only three exclusive-OR gates 32 and three NAND gates 33 are shown, there are actually eight exclusive-OR gates 32 and eight NAND gates 33 respectively for the eight bits of one word.

Operation

The operation of the circuit of FIG. 1 will now be described. As is already described, the overall operation of the circuit of FIG. 1 is to modify the image data Y read from the image memory 14 by use of the font data X read from the font memory 13 and return the modified data Y' to the same memory location in the image data 14. The operation for the modification will now be described with reference to FIG. 6A to FIG. 6D.

Figure 6A:
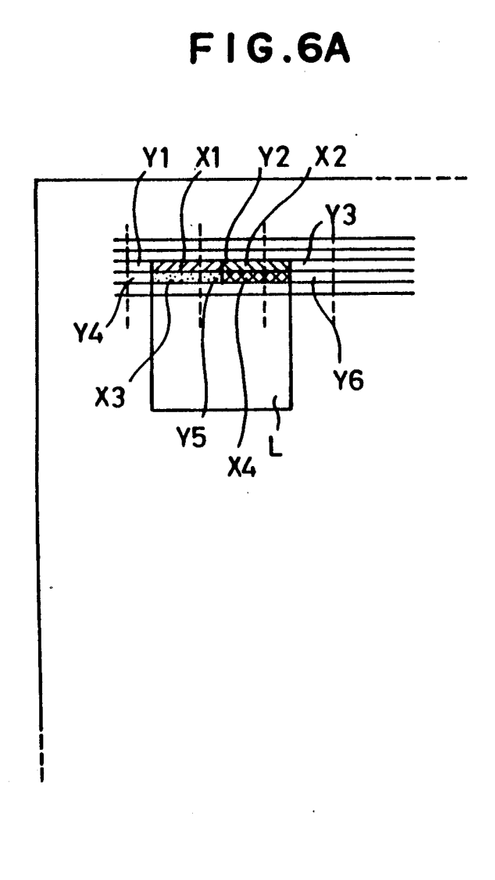
FIG. 6A to FIG. 6D show the examples of the contents in the image memory and the font memory, and how the respective words are combined.
Figure 6B:
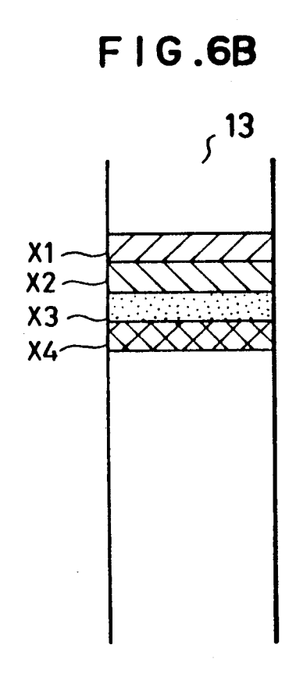
Figure 6C:
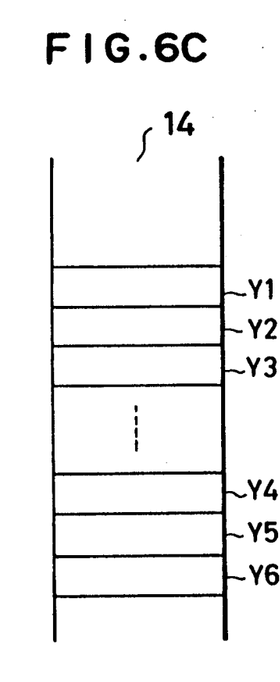
Figure 6D:
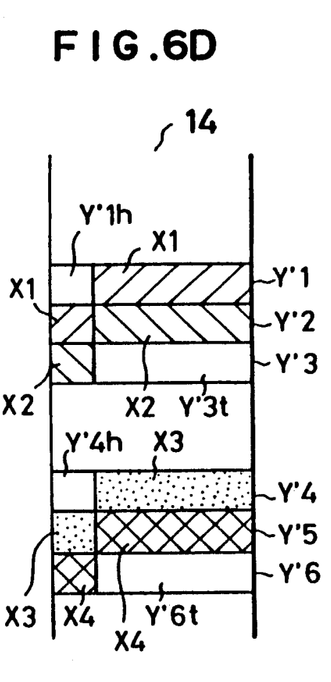

FIG. 6A shows the how the font data words X1 to X4 are superimposed on the image data words Y1 to Y6. For simplicity of explanation, it is assumed that the font data words replace the image data words in those regions where they are superimposed, and in such a case, FIG. 6A may be considered as showing the print-out, i.e., the result of printing on a paper. FIG. 6B shows the font words as stored in the font memory 13. The font words X1 to X4 represent print data corresponding to the portions marked X1 to X4 in the print-out. FIG. 6C shows the image words as stored in the image memory 14 before the modification by the font data words, and the image words marked Y1 to Y6 correspond to the words Y1 to Y6 in FIG. 6A. FIG. 6D shows the image words Y'1 to Y'6 as stored in the image memory 14 after the modification by the font data words. It will be seen that the image word Y1 has been partially replaced by the font word X1, the image word Y2 has been entirely replaced by part of the font word X1, and part of the font word X2, and the image word Y3 has been partly replaced by the font word X2. Similarly, the image word Y4 has been partially replaced by the font word X3, the image word Y5 has been entirely replaced by part of the font word X3, and part of the font word X4, and the image word Y6 has been partly replaced by the font word X4.

The operation is described in further detail.

Figure 9:
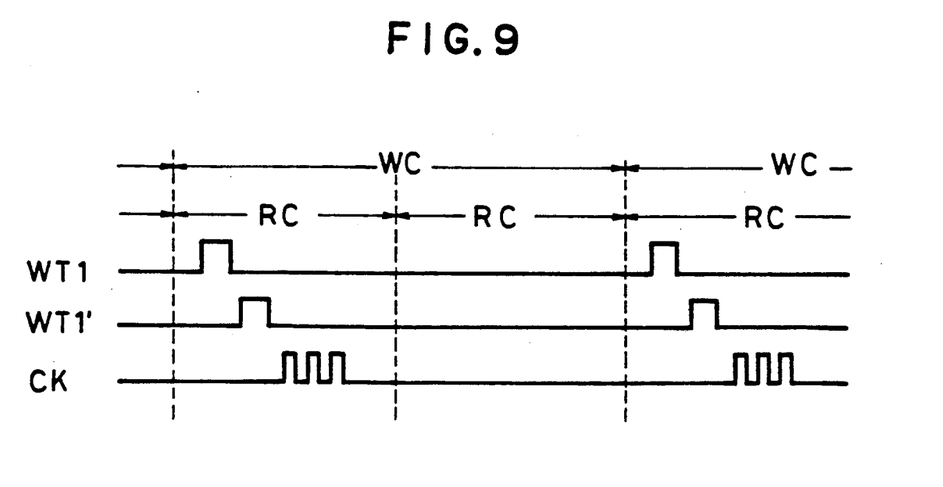
FIG. 9 is a time chart showing word timing signals and shift clocks.

First, at the beginning of processing of each character, the character timing signals CT1, CT2 and CT3 are generated. Responsive to the character timing signal CT1, the offset number S is read and stored in the offset register 23. Responsive to the second character timing signal CT2, the function specifying data FS is stored in the function register 41. Responsive to the third character timing signal CT3, the width number N is stored in the width register 21. At the beginning of each line cycle, i.e., processing of each line, the line timing signal LT is generated. Responsive to the line timing signal LT, the width number N is transferred from the width register 21 to the down counter 28. The word timing signals WT1 and WT2 are generated every word cycle. Each word cycle comprises two read cycles RC, as illustrated in FIG. 9. In the first read cycle RC, the font data is read from the font memory 13 and transferred to the font shifter. In the second read cycle RC, the image data is read from the image memory 14 and stored in the image register 17.

Responsive to the line timing signal LT, the width number N is transferred to the down counter 28.

Responsive to the word timing signal WT1, the font word X1 is read from the font memory 13, and stored in the font register 15, and the contents in the second shift register 25B are transferred to the tail register 26. Responsive to the word timing signal WT1', the word X1 that has been stored in the font register 15 is then transferred to the first shift register 25A, and an all-zero word is set in the second shift register 25B. Then, the shift clock generating circuit 24 generates S shift clocks. Responsive to the shift clocks, the data stored in the first shift register 25A are shifted through the first and second shift registers 25A and 25B. If the font word is "10110101," after the three shift clock pulses, the words in the shift registers 25A and 25B will be as shown in FIG. 1. The tail register 26 is then filled with an all-zero word because the all-zero word has been transferred from the second shift register 25B before (i.e., upon reception of the word timing signal WT1 during the preceding word cycle), so the output of the OR-logic circuit 27 will be identical to the output of the first shift register 25A.

Concurrently with the above operations, the mask controller 22 operates as follows: At the beginning of each line cycle, the line timing signal LT is produced as described before, and the width number N is transferred from the width register 21 to the down counter 28. Responsive to the word timing signal WT1, the down counter 28 is decremented by one and its count value becomes "2." Accordingly, the C terminal of the comparator 30 produces "1" while its D terminal produces "0." Responsive to the word timing signal WT1, an all-one word is set in the shift register 29. The output of the mask shift register 29 is therefore "11111111." Then, by virtue of the three shift clock pulses, the data in the shift register 32 will be "00011111." Since, the C terminal of the comparator 30 is at "1" and the D terminal of the comparator 30 is at "0," the converted mask control data output from the NAND gates 33 will be "0001111." This means that the source mask control word as produced by the mask control data source 7 is passed unaltered.

The image word Y1 is then read from the image memory 14, and stored in the image register 17. If the image word is "01010101," the data stored in the image register is as shown in FIG. 2.

Figure 7:
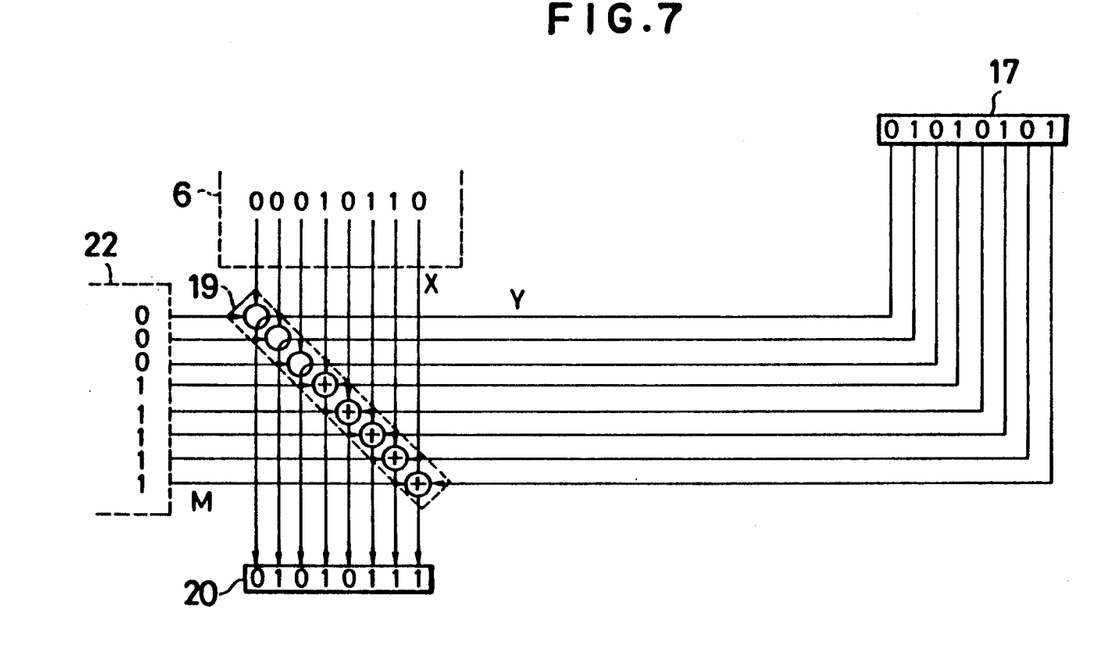
FIG. 7 shows selective enablement and disablement of the operation at the arithmetic-logic unit.

Then, the arithmetic-logic unit 19 performs the operation being specified by the function specifying data FS, but the specified operation is enabled or disabled in regard to the respective bits, depending on the corresponding bits of the mask control data M. This selective enablement and disablement of the operation is illustrated in FIG. 7. It is assumed that the arithmetic operation specified by the function specifying data FS is the logical sum operation. When the corresponding bit of mask control data M is "0," the specified operation is disabled on that bit, and the bit of the data on the Y input, i.e., the data from the image memory 14, is output unaltered. When the corresponding bit of the mask control data M is "1," the specified operation is performed, and the result of the operation is output from the arithmetic-logic unit 29. In FIG. 7, circles with "+" therein for the respective bits indicate that the logical sum operation is performed while the empty circle means no logical sum operation is conducted but the data from the Y input is output unaltered.

In the example shown in FIG. 7, the data input through the X input terminal is "00010110," and the data input through the Y input terminal is "01010101," and the data input through the M input terminal is "00011111," and the output of the arithmetic-logic unit 19 is "01010111."

The output Y' of the arithmetic-logic unit 19 is stored in the write-back register 20 responsive to the word timing signal WT2', and the data stored in the write-back register 20 is written in the image memory 14, at the memory location (address) from which the image word Y1 has been read. Thus, the image word Y1 in FIG. 6C is replaced by the modified image word Y'1 shown in FIG. 6D. Comparison between the image word Y1 in FIG. 6C and the modified image word Y'1 in FIG. 6D will show that the left three bits are unaltered, while the right five bits have been replaced by the results of the logical sum. This selective enablement and disablement of the specified operation is by virtue of the mask control word M.

The second font word X2 is then read from the font memory 13, and is stored in the font register 15. Then, in the same way as the before, the font word is shifted through the shift registers 25A and 25B by S bit positions, the number S being kept stored in the offset register 23. As a result, the first shift register 25A stores the five left bits (head) of the font word X2, at their right five bit positions, and since the tail register 26 stores the three right bits (tail) of font word X1 at the three left positions, the output of the OR-logic circuit 27 will be a combination of the tail of the first font word X1 and the head of the second font word X2.

Concurrently with the above operations, the mask controller 22 operates as follows: As described before, when the font word X2 is stored in the font register 15, the down counter 28 is decremented by one, so its count value becomes "1." The two output terminals of the comparator 30 will be both at "0," and the output of the OR gate 31 will be at "0," and hence all the outputs of all the NAND gates 33 will be at "1." That is, the mask control data from the mask controller 22 is all-one, "11111111."

Then, the image word Y2 is read from the image memory 14, and stored in the image register 17.

The arithmetic-logic unit 19 then conducts the operation. Because the source mask control data M from the mask controller 22 is all-one, the operation is conducted on all the bits.

The data output from the arithmetic-logic unit 19, i.e., the modified image word Y'2, is then stored in the write-back register 20, and then written in the image memory 14, at the memory location (address) from which the image word Y2 has been read.

Then, in the same way as described before, the output of the shift register 25B is stored in the tail register 26, and the shift register 25B is reset to all-zero.

Subsequently, in place of a font word, an all-zero word is then stored in the font register 15 by means of the controller 11. This all-zero word is thereafter promptly transferred to the first shift register 25A. Then, in the same way as described before, the data in the shift registers 25A and 25B is shifted. After this shifting, the contents stored in the shift register 25A is all-zero, and the output of the OR-logic circuit 27 is the output of the tail register 26, which is the tail of the second font word X2.

Concurrently with the above described operation, the mask controller 24 operates as follows: In the same way as described above, when the all-zero word is stored in the font register 15, the down counter 28 is decremented by one, so its count value becomes "0." As a result, the C output terminal of the comparator 30 produces "0," while D output terminal produces "1." Accordingly, the output of the NAND gates 33 is the inversion of the output of the shift register 29. When the shift clock has been inputted three times, the output of the shift register is "00011111," so its inversion is "11100000." Thus, mask control data "11100000" is produced from the mask controller 24. This converted mask control word has a significance that with regard to the left three bits of the image word Y3, the specified operation is performed by the arithmetic-logic unit 19, while with regard to the right five bits of the image word Y3, the specified operation is disabled, and the output of the image data is unaltered.

The image word Y3 is then read from the image memory 14, and stored in the image register 17. Then, operation is performed by the arithmetic-logic unit 19. By virtue of the mask control data "11100000," being supplied from the mask controller 24, the operation is limited to the left three bits, and the specified operation is not performed on the right five bits.

After that, in the same way as described above, the modified image word Y'3 from the arithmetic-logic unit 29 is stored in the write-back register 20, and then written in the image memory 14, at the memory location from which the image word Y3 has been read.

Then, the first font word X3 in the second line of the character or font is read from the font memory 13 and stored in the font register 15. Responsive to a line timing signal LT, which is then produced, the number "N=3" is set in the down counter 28, while the offset count "S=3" is kept stored in the offset register 23. With these initial parameters, the operations similar to those described above are performed using the font words X3 and X4, and the image words Y4 to Y6, to produce the modified image words Y'4 to Y'6.

When the processing on the words in the second line is completed, then the words in the third line are processed, and then the words in the fourth line, and so on. The number N stored in the width register 21 is transferred to the down counter 28 each time processing of a new line is started. In this way, image words are processed using the the font words, successively.

When the processing on the entire character or font is completed, processing on the next character or font is commenced.

Modifications

The transfer of image words from the image memory to the image register, of the font word from the font memory to the font shifter, and of the modified image word from the write-back register to the image memory is controlled by the controller 11.

But such transfer may alternatively be controlled by some other circuit element, such as a DMA (direct-memory access) controller, not shown, separate from the controller which performs the overall control.

In the preceding example, the operation performed in the arithmetic-logic unit 19 was to the logical sum. Other operations can be specified by the varying the function specifying data FS input to the arithmetic-logic unit 19. For example, a bitwise replacing operation by which the bits of the image words are replaced by the bits of the font words, in so far as the image words and the font words are superimposed.

Advantages

An advantage of the novel print data generator is that intervention by the controller 11 is reduced. That is the mask control word can be generated by the mask controller 22 with little intervention by the controller 11. Modified image data, which becomes the print data used for printing, can therefore be generated much more rapidly than in prior-art devices that required the controller 11 to provide mask control words.

Another advantage of the invention is that print data generation is particularly efficient because the same shift clock pulses shift both the font words and the mask control words.

The scope of this invention is not restricted to the embodiment shown in the drawings, but includes various modifications that will be obvious to one skilled in the art.

What is claimed is:

1. A print data generator for modifying bit-mapped image data according to bit-mapped font data, comprising:
   an image memory for storing image words, each word consisting of L bits;
   a font memory for storing font words each word consisting of L bits, with the number of words in each line of a font being (N−1);

a number selecting controller for selecting a bit offset number S representing a bit offset between said image words and said font words, and a width number W which is one greater than the number of font words (N−1) per line;

a shift clock generator for receiving said offset number S from said number selecting controller and repeatedly generating series of shift clock pulses comprising S pulses each;

a font shifter for receiving (N−1) successive font words from said font memory and receiving said series of S shift clock pulses from said shift clock generator, and generating shifted font words, the last shifted font word in each line comprising S bits at the tail of the last font word for the S bits at the head of the shifted font word;

the first shifted font word in each line comprising (L−S) bits at the head of the first font word for the (L−S) bits at the tail of the shifted font word;

the shifted font words other than the first and last shifted font words each consisting of (L−S) bits at the head of one received font word for the tail of the shifted font word and S bits at the tail of the preceding received font word for the head of the shifted font word;

a mask control data source for receiving said series of S shift clock pulses from said shift clock generator and generating source mask control words comprising S disable bits followed exclusively by enable bits;

a mask control data converter for receiving data indicative of the width number N from said number selecting controller, receiving said source mask control words from said mask control data source, and generating converted mask control words by passing the first source mask control word through unaltered, substituting all enable bits for the next (N−2) source mask control words, and inverting the Nth source mask control word; and an arithmetic-logic unit for receiving an image word from said image memory, a shifted font word from said font shifter, and a converted mask control word from said mask control data converter, and using said font word to modify bits of said image word that correspond to enable bits in said converted mask control word, thereby creating a modified image word; and means for transferring said modified image word to said image memory.

2. The print data generating of claim 1, wherein said means for transferring said modified image word to said image memory comprises a write-back register for storing said modified image word until it is transferred to said image memory.

3. The print data generator of claim 1, wherein said means for transferring said modified image word to said image memory transfers the modified image word at the memory location from which the image word has been read.

4. The print data generator of claim 1, wherein said font shifter comprises:

a first shift register for successively receiving font words from said font memory and receiving said shift clock pulses from said shift clock generator, shifting each of said received words according to said shift clock pulses, and filling the vacated bit position is with zero bits;

a second shift register, connected to said first shift register and reset to all-zero data before said first shift register begins the shifting, for receiving said shift clock pulses from said shift clock generator, shifting said all-zero data according to said shift clock pulses, and filling the vacated bit positions with bits shifted out of said first shift register;

a tail register for receiving and storing the contents of said second shift register when said modified image word is transferred from said write-back register to said image memory; and an OR-logic circuit for performing an OR operation on the contents of said first shift register and said tail register.

5. The print data generator of claim 1, wherein said mask control data source comprises:

a mask shift register; and means for setting an enable word consisting entirely of enable bits in said mask shift register;

said mask shift register being responsive to said shift clock pulses from said shift clock generator for shifting said enable word according to said shift clock pulses, and filling the vacated bit positions with disable bits.

6. The print data generator of claim 1, wherein said mask control data converter comprises:

a width register for storing said width number N;

a down-counter being loaded with the number N when processing of each line is started, and then being decremented each time a font word is transferred to said font shifter;

a comparator for comparing the number stored in said width register with the count value in said down counter, having first and second output nodes, and producing a True signal at a first output terminal and a False signal at a second output terminal when the count value in said counter is one less than said number in said width register, producing a False signal at said first output node and a True signal at said second output node when the count value in said counter is zero, and producing False signals both at said first and second output nodes in other times;

an OR gate for ORing the signals at said first and second output nodes of said comparator;

exclusive-OR gates for receiving at one input terminals the respective bits of the number stored in said mask shift register and receiving at the other inputs the output at said first output node of said comparator; and NAND gates for receiving at one input terminals the respective outputs of said exclusive-OR gates and receiving at the other inputs the output of said OR gate;

the outputs of said NAND gates forming said converted mask control word.

7. The data generator of claim 1, wherein said first shifted font word in each line comprises zero bits for the S bits at the head, and said last shifted font word in each line comprises zero bits for the (L−S) bits at the tail.

8. A print data generator for modifying bit-mapped image data according to bit-mapped font data, comprising:

an image memory for storing image words, each word consisting of L bits;

a font memory for storing font words each word consisting of L bits;

a number selecting controller for selecting a bit offset number S representing a bit offset between said image words and said font words, and a width number W which is one greater than the number of font words per line;

a shift clock generator for receiving said offset number S from said number selecting controller and repeatedly generating series of shift clock pulses comprising S pulses each;

a font shifter for receiving (N−1) successive font words from said font memory and then an all-zero word, receiving said series of S shift clock pulses from said shift clock generator, and generating shifted font words, the first shifted font word in each line consisting of S bits at the tail of the first font word for the S bits at the head of the shifted font word and zero bits for the remaining bits;

the last shifted font word in each line consisting of (L−S) bits at the head of the last font word for the (L−S) bits at the tail of the shifted font word and zero bits for the remaining bits;

the shifted font words other than the first and last shifted font words each consisting of (L−S) bits at the head of one received font word for the tail of the shifted font word and S bits at the tail of the preceding received font word for the head of the shifted font word;

a mask control data source for receiving said series of S shift clock pulses from said shift clock generator and generating source mask control words comprising S disable bits followed exclusively by enable bits;

a mask control data converter for receiving data indicative of the width number N from said number selecting controller, receiving said source mask control words from said mask control data source, and generating converted mask control words by passing the first source mask control word through unaltered, substituting all enable bits for the next (N−2) source mask control words, and inverting the Nth source mask control word; and an arithmetic-logic unit for receiving an image word from said image memory, a shifted font word from said font shifter, and a converted mask control word from said mask control data converter, and using said font word to modify bits of said image word that correspond to enable bits in said converted mask control word, thereby creating a modified image word; and means for transferring said modified image word to said image memory wherein said mask control data converter comprises:

a width register for storing said width number N;

a down-counter being loaded with the number N when processing of each line is started, and then being decremented each time a font word or an all-zero word is transferred to said font shifter;

a comparator for comparing the number stored in said width register with the count value in said down counter, having first and second output nodes, and producing a True signal at a first output terminal and a False signal at a second output terminal when the count value in said counter is one less than said number in said width register, producing a False signal at said first output node and a True signal at said second output node when the count value in said counter is zero, and producing False signals both at said first and second output nodes in other times;

an OR gate for ORing the signals at said first and second output nodes of said comparator;

exclusive-OR gates for receiving at one input terminals the respective bits of the number stored in said mask shift register and receiving at the other inputs the output at said first output node of said comparator; and NAND gates for receiving at one input terminals the respective outputs of said exclusive-OR gates and receiving at the other inputs the output of said OR gate;

the outputs of said NAND gates forming said converted mask control word.

* * * * *